3,375,164
TRIAMINE ACID ADDITION SALTS IN ANTI-FUNGAL METHODS AND COMPOSITIONS

Michael G. Mulinos, Westfield, N.J., assignor to Commercial Solvents Corporation
No Drawing. Continuation-in-part of application Ser. No. 56,661, Sept. 19, 1960. This application Nov. 17, 1964, Ser. No. 411,702
17 Claims. (Cl. 167—58)

This application is a continuation-in-part of U.S. patent application Ser. No. 56,661, filed Sept. 19, 1960, now U.S. Patent 3,164,619 of Jan. 5, 1965.

The present invention relates to a process for treating superficial fungus infections and to antifugal compositions, and more particularly it relates to such compositions containing acid addition salts of alkyl triamines, which salts possess antifungal activity, as the essential antifungal ingredient.

U.S. Patent No. 2,436,779 by Murray Senkus describes certain alkyl triamines including some of the compounds from which the instant acid addition salts are prepared. Similarly copending application Ser. No. 738,928 filed June 2, 1958, by John B. Tindall, now abandoned, describes applicable alkyl triamines.

In the past, many compounds have been discovered to have antibacterial activity, but comparatively few have been found to have antifungal activity permitting therapeutic use at practical levels. Further consideration must also be given to toxicity, especially the topical irritation and skin sensitization (allergenicity) frequency encountered in the use of prior antifungal agents.

Certain new compositions possessing practical antifungal activity which new compositions are essentially non-toxic when employed in amounts adequate to eradicate fungal infections caused by susceptible fungi have now been discovered. These compositions includes as their active, essential ingredient triamine acid addition salts such as defined in applicant's copending application Ser. No. 56,661, filed Sept. 19, 1960, and now U.S. Patent 3,164,619, which have the following general formula:

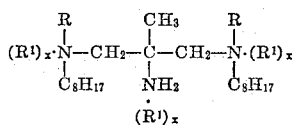

wherein R consists of groups selected from the class consisting of hydrogen and methyl, with the proviso that if one R is methyl, then the other R must be hydrogen; $R^1$ consists of groups selected from the class consisting of propionic, caprylic, and undecylenic acids; and $x$ is either 0 or 1, with the proviso that at least one $x$ is 1.

Illustrative of such triamine acid addition salts included in the above general formula are $N^1$,2-dimethyl-$N^1$,$N^3$-bis(2-ethylhexyl) - 1,2,3 - propanetriamine mono-propionate; $N^1$,2-dimethyl - $N^1$,$N^3$ - bis(2-ethylhexyl)-1,2,3-propanetriamine dipropionate; $N^1$,2-dimethyl - $N^1$,$N^3$ - bis(2-ethylhexyl)-1,2,3-propanetriamine tripropionate; $N^1$,2-dimethyl-$N^1$,$N^3$-bis(2-ethylhexyl) - 1,2,3 - propanetriamine monocaprylate; $N^1$,2 - dimethyl-$N^1$,$N^3$-bis(2-ethylhexyl)-1,2,3-propanetriamine dicaprylate; $N^1$,2-dimethyl-$N^1$,$N^3$-bis(2 - ethylhexyl) - 1,2,3 - propanetriamine tricaprylate; $N^1$,2-dimethyl-$N^1$,$N^3$-bis(2-ethylhexyl - 1,2,3 - propanetriamine mono-undecylenate; $N^1$,2 - dimethyl - $N^1$,$N^3$-bis(2-ethylhexyl)-1,2,3-propanetriamine diundecylenate; $N^1$,2-dimethyl-$N^1$,$N^3$-bis(2 - ethylhexyl)1,2,3 - propanetriamine triundecylenate; $N^1$,$N^3$bis(2-ethylhexyl) - 2 - methyl-1,2,3-propanetriamine mono-propionate; $N^1$,$N^3$ - bis(2 - ethylhexyl)-2-methyl-1,2,3-propanetriamine dipropionate; $N^1$,$N^3$-bis(2-ethylhexyl) - 2-methyl - 1,2,3 - propanetriamine tripropionate; $N^1$,$N^3$-bis(2-ethylhexyl) - 2 - methyl-1,2,3-propanetriamine mono-caprylate; $N^1$,$N^3$ - bis(2 - ethylhexyl)-2-methyl - 1,2,3 - propanetriamine dicaprylate; $N^1$,$N^3$-bis(2-ethylhexyl) - 2-methyl - 1,2,3 - propanetriamine tricaprylate; $N^1$,$N^3$-bis(2-ethylhexyl)-2-methyl - 1,2,3-propanetriamine mono-undecylenate; $N^1$,$N^3$ - bis(2 - ethylhexyl)-2-methyl - 1,2,3 - propanetriamine diundecylenate; $N^1$,$N^3$-bis(2-ethylhexyl) - 2 - methyl - 1,2,3 - propanetriamine triundecylenate and the like.

In preparing the triamine acid addition salts, the corresponding triamine having the following general formula

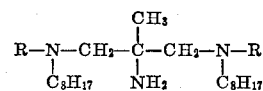

wherein R consists of groups selected from the class consisting of hydrogen and methyl with the proviso that if one R is methyl, then the other R must be hydrogen, is reacted with propionic, caprylic or undecylenic acids. The triamine acid addition salts of my invention are prepared by mixing 1 mole of the corresponding triamine with 1, 2 or 3 moles of caprylic, propionic or undecylenic acid. Furthermore, mixtures of the three acids can be used. For instance, 1 mole of $N^1$,$N^3$-bis(2-ethylhexyl)-2-methyl-1,2,3-propanetriamine can be mixed with 1 mole of caprylic and 2 moles of undecylenic acid, or 1 mole of $N^1$,$N^3$-bis(2-ethylhexyl) - 2 - methyl - 1,2,3-propanetriamine can be mixed with 2 moles of propionic acid, etc.

When utilizing $N^1$,2-dimethyl-$N^1$,$N^3$-bis(2-ethylhexyl)-1,2,3-propanetriamine, as the triamine starting material, it can be prepared according to the disclosure of copending application Ser. No. 738,928 filed June 2, 1958, by John B. Tindall. Whereas, when utilizing $N^1$,$N^3$-bis(2-ethylhexyl)-2-methyl-1,2,3-propanetriamine, as the triamine starting material, it can be prepared according to the disclosure of U.S. Patent No. 2,436,779.

The above compounds are uniquely suited for use as antifungal agents. For example, they can be incorporated in soaps and other suitable vehicles to enhance the normal washing activity of soaps with antifungal properties. The compounds can also be used in shampoos to give antifungal properties to shampoos and thereby give antifungal protection to those areas or objects washed with these cleansers. Similarly the compounds can be used to impart antifungal activity to washable or non-water washable ointments and lotions. Another exellent way to apply the compositions is in the form of an aerosol or a therapeutic antifungal foot powder. Aerosols provide a good carrier and efficient mode of application for topical therapy in the treatment of superficial fungus infections. Generally, the compound will be present in the vehicle in amounts of at least about 0.1% by weight, preferably 0.5%, and although larger amounts may be used if desired, typically no more than about 5% by weight of the compound is used.

The following examples further illustrate the present invention, but it is not intended that this invention be limited to the compounds, etc., set out therein. Rather, it is intended that equivalents obvious to those skilled in the art be included within the scope of the invention as claimed.

Example 1

The following table sets out the antifungal effects of compounds used in the instant invention. The compounds set out in Table I were found to inhibit completely the described organism at the described minimum inhibition concentration.

TABLE I.—MINIMUM INHIBITORY CONCENTRATIONS IN PARTS PER MILLION

| Test Compound | Test Organism | | | |
|---|---|---|---|---|
| | Aspergillus niger | Candida albicans | Penicillium chrysogenum | Fusarium oxysporum |
| $N^1$,2-dimethyl-$N^1$,$N^3$-bis(2-ethylhexyl)-1,2,3-propanetriamine dipropionate | 500-1000 | 500-1000 | 10-100 | 10-100 |
| $N^1$,2-dimethyl-$N^1$,$N^3$-bis(2-ethylhexyl)-1,2,3-propanetriamine tripropionate | 100-500 | 100-500 | 100-500 | 10-100 |
| $N^1$,2-dimethyl-$N^1$,$N^3$-bis(2-ethylhexyl)-1,2,3-propanetriamine dicaprylate | 500-1000 | 500-1000 | 100-500 | 10-100 |
| $N^1$,2-dimethyl-$N^1$,$N^3$-bis(2-ethylhexyl)-1,2,3-propanetriamine tricaprylate | 100-500 | 100-500 | 10-100 | 10-100 |
| $N^1$,$N^3$-bis(2-ethylhexyl)-2-methyl-1,2,3-propanetriamine dipropionate | 100-500 | 100-500 | 10-100 | 10-100 |
| $N^1$,$N^3$-bis(2-ethylhexyl)-2-methyl-1,2,3-propanetriamine tripropionate | 100-500 | 100-500 | 10-100 | 10-100 |
| $N^1$,$N^3$-bis(2-ethylhexyl)-2-methyl-1,2,3-propanetriamine dicaprylate | 100-500 | 100-500 | 10-100 | 10-100 |
| $N^1$,$N^3$-bis(2-ethylhexyl)-2-methyl-1,2,3-propanetriamine tricaprylate | 100-500 | 100-500 | 10-100 | 10-100 |

*Example II*

A therapeutic antifungal foot powder can be prepared by mixing 0.5 to 5.0 grams of $N^1$,2-dimethyl-$N^1$,$N^3$-bis(2-ethylhexyl)-1,2,3-propanetriamine tricaprylate with 10.0 grams boric acid, 20.0 grams of starch and enough talc to make a 100.0 gram composition.

*Example III*

A very fine washable therapeutic ointment can be prepared by mixing 0.5 to 5.0 grams of $N^1$,2-dimethyl-$N^1$,$N^3$-bis(2 - ethylhexyl) - 1,2,3 - propanetriamine tripropionate with enough hydrophilic ointment (USP) to make 100 grams of ointment. Hydrophilic ointment (USP) is a water-removable ointment base having a formulation as follows:

| | Gm. |
|---|---|
| Methylparaben | 0.25 |
| Propylparaben | 0.15 |
| Sodium lauryl sulfate | 10.00 |
| Propylene glycol | 120.00 |
| Stearyl alcohol | 250.00 |
| White petrolatum | 250.00 |
| Purified water | 370.00 |
| To make about | 1000.00 |

*Example IV*

A non-water washable therapeutic ointment can be prepared by mixing 0.5 to 5.0 grams of $N^1$,$N^3$-bis(-2-ethylhexyl)-1,2,3-propanetriamine diundecylenate with enough petroleum white ointment (USP) to make 100 grams of ointment.

*Example V*

A therapeutic aerosol spray for topical application can be formulated as follows:

| | Percent |
|---|---|
| Fungicide of Example I | 0.5-5 |
| Dipropylene glycol | 8-10 |
| Isopropyl myristate | 2-4 |
| Menthol, about | 0.05 |
| Sufficient propellant (Freons) to make | 100.0 |

*Example VI*

A liquid cream therapeutic shampoo can be formulated as follows:

| | Parts |
|---|---|
| Fungicide of Example I | 0.5-5.0 |
| Sodium lauryl sulfate paste | 45.0 |
| Polyethylene glycol 400 distearate | 3.0 |
| Ethylene glycol monostearate | 1.0 |
| Propylene glycol | 2.0 |
| Water to make | 100.0 |

*Example VII*

A therapeutic lotion can be formulated as follows:

| | Parts |
|---|---|
| Fungicide of Example I | 0.5-5.0 |
| Methyl cellulose | 0.5 |
| Glycerin | 2.0 |
| Alcohol | 10.0 |
| Water to make | 100.00 |
| Perfume, q.s. | |

*Example VIII*

The following compounds also exhibit antifungal characteristics in foot powders, soaps, aerosols, shampoos and ointments: $N^1$,2-dimethyl-$N^1$,$N^3$-bis(2-ethylhexyl)-1,2,3-propanetriamine mono-undecylenate; $N^1$,$N^3$-bis(2-ethylhexyl)-2-methyl-1,2,3-propanetriamine mono-undecylenate; $N^1$,2 - dimethyl - $N^1$,$N^3$ - bis(2 - ethylhexyl)-1,2,3-propanetriamine mono-propionate; $N^1$,$N^3$-bis(2-ethylhexyl)-2-methyl-1,2,3-propanetriamine mono-caprylate; $N^1$,2-dimethyl-$N^1$,$N^3$-bis(2-ethylhexyl)-1,2,3-propanetriamine diundecylenate; $N^1$,$N^3$ - bis(2 - ethylhexyl) - 2-methyl-1,2,3-propanetriamine triundecylenate; $N^1$,2 - dimethyl - $N^1$,$N^3$ - bis(2 - ethylhexyl) - 1,2,3-propanetriamine mono-caprylate; $N^1$,$N^3$ - bis(2 - ethylhexyl)-2-methyl-1,2,3-propanetriamine mono-propionate; $N^1$,2 - dimethyl - $N^1$,$N^3$ - bis(2 - ethylhexyl) - 1,2,3-propanetriamine triundecylenate; and $N^1$,$N^3$-bis(2-ethylhexyl)-2-methyl-1,2,3-propanetriamine diundecylenate.

It is claimed:

1. A process for treating superficial fungus infections which comprises applying to the skin as the essential antifungal agent a triamine acid salt having the following general formula:

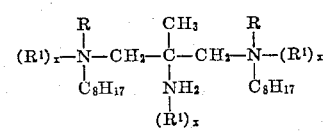

wherein R represents a member selected from the group consisting of hydrogen and methyl, with the proviso that if one R is methyl then the other R must be hydrogen; $R^1$ represents a member selected from the group consisting of caprylic, propionic and undecylenic acids, and $x$ is selected from the group consisting of 0 and 1, with the proviso that at least one $x$ is 1, in an effective antifungal amount.

2. The process of claim 1 wherein $R^1$ is caprylic acid.

3. The process of claim 1 wherein $R^1$ is propionic acid.

4. The process of claim 1 wherein $R^1$ is undecylenic acid.

5. The process of claim 1 wherein said salt is $N^1,2$-dimethyl - $N^1,N^3$ - bis(2 - ethylhexyl) - 1,2,3 - propanetriamine dipropionate.

6. The process of claim 1 wherein said salt is $N^1,2$-dimethyl - $N^1,N^3$ - bis(2 - ethylhexyl) - 1,2,3 - propanetriamine tripropionate.

7. The process of claim 1 wherein said salt is $N^1,2$-dimethyl - $N^1,N^3$ - bis(2 - ethylhexyl) - 1,2,3 - propanetriamine dicaprylate.

8. The process of claim 1 wherein said salt is $N^1,2$-dimethyl - $N^1,N^3$ - bis(2 - ethylhexyl) - 1,2,3 - propanetriamine tricaprylate.

9. The process of claim 1 wherein said salt is $N^1,N^3$-bis(2 - ethylhexyl) - 2 - methyl - 1,2,3 - propanetriamine dipropionate.

10. The process of claim 1 wherein said salt is $N^1,N^3$-bis(2 - ethylhexyl) - 2 - methyl - 1,2,3 - propanetriamine tripropionate.

11. The process of claim 1 wherein said salt is $N^1,N^3$-bis(2 - ethylhexyl) - 2 - methyl - 1,2,3 - propanetriamine dicaprylate.

12. The process of claim 1 wherein said salt is $N^1,N^3$-bis(2 - ethylhexyl) - 2 - methyl - 1,2,3 - propanetriamine tricaprylate.

13. A therapeutic anti-fungal composition consisting essentially of a topical carrier and anti-fungal amounts of a triamine acid salt having the following general formula:

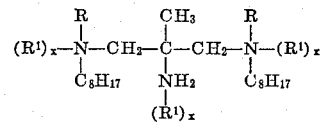

wherein R represents a member selected from the group consisting of hydrogen and methyl, with the proviso that if one R is methyl then the other R must be hydrogen; $R^1$ represents a member selected from the group consisting of caprylic, propionic and undecylenic acids; and $x$ is selected from the group consisting of 0 and 1, with the proviso that at least one $x$ is 1.

14. The composition of claim 13 wherein the carrier is a foot powder.

15. The composition of claim 13 wherein the carrier is a shampoo.

16. The composition of claim 13 wherein the carrier is an ointment.

17. The composition of claim 13 wherein the carrier is an aerosol.

References Cited

UNITED STATES PATENTS

| | | | |
|---|---|---|---|
| 2,290,174 | 7/1942 | Epstein et al. | 167—22 |
| 2,436,779 | 2/1948 | Senkus | 260—404.5 X |
| 2,994,675 | 8/1961 | Haward et al. | 260—404.5 X |
| 2,998,438 | 8/1961 | Charney et al. | 260—404.5 |

ALBERT T. MEYERS, *Primary Examiner.*

V. C. CLARKE, *Assistant Examiner.*